United States Patent [19]

Stemmer

[11] Patent Number: 4,862,919

[45] Date of Patent: Sep. 5, 1989

[54] HYDRAULIC CONTROL SYSTEM FOR A MULTI-POSITION VALVE

[75] Inventor: Frank Stemmer, Lohr/Main, Fed. Rep. of Germany

[73] Assignee: Mannesmann Rexroth GmbH, Lohr/Main, Fed. Rep. of Germany

[21] Appl. No.: 293,424

[22] Filed: Jan. 4, 1989

[30] Foreign Application Priority Data

Jan. 15, 1988 [DE] Fed. Rep. of Germany ....... 3801072

[51] Int. Cl.⁴ .............................................. F15B 11/08
[52] U.S. Cl. ................... 137/624.27; 251/73; 91/426
[58] Field of Search ............ 137/624.27; 251/73, 251/94; 91/426

[56] References Cited

U.S. PATENT DOCUMENTS

| | | | |
|---|---|---|---|
| 2,276,979 | 3/1942 | Jacobi | 137/624.27 |
| 2,689,585 | 9/1954 | Presnell | 137/624.27 |
| 3,465,649 | 9/1969 | Eggers | 137/624.27 X |
| 3,680,583 | 8/1972 | Clair | 137/624.27 X |

OTHER PUBLICATIONS

Article: Olhydraulik und Pneumatik—28 (Jun. 1984) No. 5, pp. 325–329.

Primary Examiner—Alan Cohan
Attorney, Agent, or Firm—Burns, Doane, Swecker & Mathis

[57] ABSTRACT

A hydraulic system includes a multi-position valve which controls the flow of system fluid pressure to various work stations. The multi-position valve is biased by a centering spring to a neutral position from which it can be shifted to a selected working position. A retaining mechanism is able to retain the valve in the selected working position when the system pressure is in a prescribed pressure range. The retaining mechanism is urged to its retaining position by a control fluid pressure which is derived from the system pressure. When the system pressure is below or above the prescribed pressure range the retaining mechanism is unable to resist the force of the centering spring and the valve assumes a neutral position. When the system pressure is in the prescribed range, a constant control pressure is supplied to the retaining mechanism for effectively resisting the force of the centering spring. This system assures that upon start-up of a machine in which the hydraulic system is incorporated, the multi-position valve will be in neutral to avoid a hazardous condition.

14 Claims, 2 Drawing Sheets

HYDRAULIC CONTROL SYSTEM FOR A MULTI-POSITION VALVE

BACKGROUND OF THE INVENTION

The invention relates to a hydraulic control system for a multi-position valve, the valve slide of which valve has at least one working position which can be retained by a catch element controlled by fluid pressure Such hydraulic control systems are increasingly used for multi-position valves which control operating pressures in mobile machines By the use of such a control system, when the system pressure is below a prescribed level, the multi-position valve is held in a defined working position by the catch, but at a system pressure higher than the prescribed level, the valve can be moved out of that working position.

Such operation is conventionally achieved by means of a catch element which is acted upon by fluid pressure in a control pressure chamber such that the control pressure in the control pressure chamber acts in such a direction tending to disengage the catch means by acting against the force of a catch-engaging spring. The control lie is supplied from the system pressure, via a pressure regulating valve, so that when a prescribed system pressure is exceeded, the pressure regulating valve delivers this system pressure to the control pressure chamber and disengages the catch by acting against the force of the catch-engaging spring.

However, such a hydraulic control system is unable to also disengage the catch action in the case where a pump pressure or load pressure in the hydraulic system falls below the prescribed value. The lack of such a capability results in safety problems in the operation of the mobile machine, attributable to the fact that with customary hydraulic control systems for such multi-position valves the valve must, during start-up conditions, be moved manually into a neutral position, in order to prevent system pressure from being delivered to an operating device. If the operator forgets to do this, a dangerous situation can result.

Accordingly, an underlying object of the invention is to devise a hydraulic control system which has a simple structure and solves the above-mentioned safety problem when the system pressure is raised during start-up, and which system retains the feature whereby when the pump pressure exceeds a prescribed value the catch means are disengaged.

SUMMARY OF A PREFERRED EMBODIMENT OF THE INVENTION

According to a preferred embodiment of the invention, a retaining or catch element is acted on in the catch-engagement direction by a pressure derived from a system pressure. Since the catch element is acted on in a catch-engagement direction by the pressure, the multi-position valve will not be retained by the catch-mechanism until a sufficient system pressure is achieved. Moreover, when the system pressure exceeds a predetermined value, the catch mechanism is communicated with a substantially lower pressure (e.g., that of a reservoir) wherein the catch mechanism will not retain the valve.

In particular, the catch element is acted on by a pressure derived from the outlet pressure of a pressure regulating valve, with the inlet pressure of the pressure regulating valve being proportional to the system pressure, i.e., a pump or load pressure of the hydraulic circuit. Further, the pressure regulating valve is controlled via a switching pressure line which contains a sufficiently high pressure signal, from a specified pump or load pressure, to move the pressure regulating valve into a position wherein the pressure in the outlet line (and thus the pressure in the control pressure chamber) can be reduced to a lower level, preferably to the level of the pressure in a reservoir. With such an arrangement, employing ordinarily commercially available hydraulic components, when the pump is stopped the catch means on the multi-position valve will be completely released; further, in the operating region of the pressure regulating valve a precisely defined (and preferably adjustable) catch force can be exerted on the catch element; and when the system exceeds a predetermined pressure value, the pressure regulating valve will be operated in its overload mode, resulting in release of the catch means due to controlled reduction of the pressure in the control pressure chamber. The hydraulic control system is therefore particularly suitable for employment in hydraulic switching circuits for mobile machines, wherein the system pressure can be produced only when the drive system is running. The inventive control system opens up the possibility of producing automatic movement (e.g., by means of a spring) of the valve slide of the multi-position valve into a position wherein the supply lines of operating devices are shut-off when the motor is shut off, so that when the system pressure is raised again (upon start-up) it is not possible for any of the operating devices to execute any unintended and improper operation.

Preferably, the overloaded mode of the pressure regulating valve is accomplished via a control pressure line which is fed via a pressure liming valve. When the (preferably adjustable) limit pressure of the pressure limiting valve is exceeded, a pressure is established in the control pressure line ahead of a throttle, which pressure is sufficient to move the pressure regulating valve into a position in which its outlet is connected to a low pressure. The pressure in the control pressure chamber is thereby reduced sufficiently to bring about release of the catch. Due to the small number of components required, namely, a pressure regulating valve, a pressure limiting valve, and a throttle, it is very simple to adjust these components for proper cooperation. There are further system cost savings in that the pressure limiting valve can be supplied hydraulically via the same branch line as the pressure regulating valve.

Preferably, the return spring of the switching valve and the return spring of the pressure regulating valve are adjustable and can be coordinated such that the hydraulic control system can be flexibly adjusted to the given hydraulic circuit and its momentary characteristics.

Preferably, the system pressure fed to the pressure regulating valve is derived from either the outlet pressure of a system pump or the load pressure of a load-sensing hydraulic system. The inventive design for a control system is not limited to these options, however.

Preferably, the return spring of the valve slide is employed to disengage the catch element from the catch means provided in the valve slide. It is advantageous to employ suitable control pressures in known fashion to stabilize the valve slide in positions other than the neutral position and the catch positions.

BRIEF DESCRIPTION OF THE DRAWINGS

The objects and advantages of the invention will become apparent from the following detailed description of preferred embodiments thereof in connection with the accompanying drawings, in which like numerals designate like elements, and in which.

DETAILED DESCRIPTION OF PREFERRED EMBODIMENTS OF THE INVENTION

Figure 1:
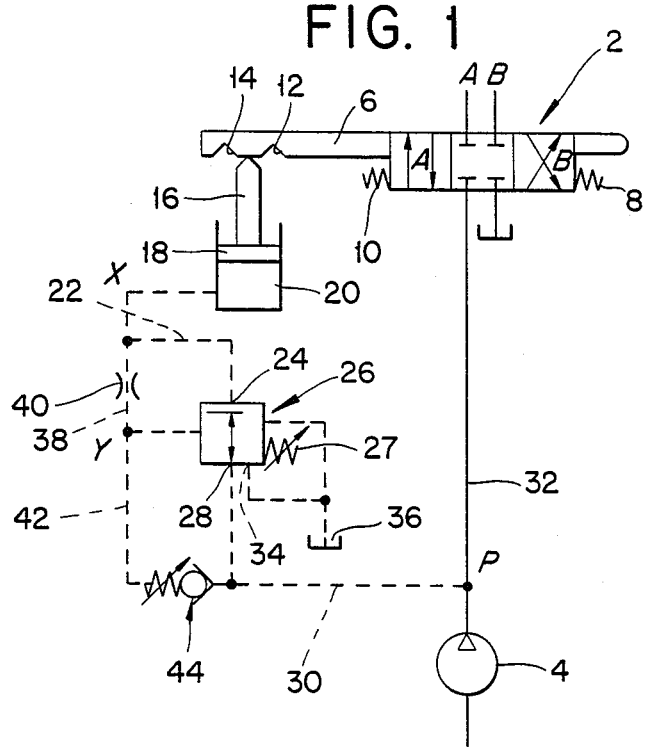
FIG. 1 is a schematic block circuit diagram of a first embodiment of the hydraulic control system according to the invention.

In the embodiment according to FIG. 1, a 4/3-way valve 2 can selectively control the connection of a system pressure P of a hydraulic circuit fed by a pump 4 to either a working load connection A or a working load connection B. The pump 4 is driven by a drive of a mobile machine in which the control system according to FIG. 1 is integrated.

A sliding body 6 of the valve 2 is slidable into switching positions A and B, against the restoring force of two centering springs 8, 10. In position A the load connection A can be supplied with system pressure P, and in position B the load connection B can be supplied with system pressure P. The valve slide 6 can be held in place in each of these two switching positions. To accomplish this, the slide 6 has two catch means in the form of recesses 12, 14 which can be engaged by a retaining or catch element 16. In the closed position of valve 2 illustrated in FIG. 1, wherein the valve slide 6 is held centrally by the two springs 8, 10, the catch element 16 is located between the two catch recesses in a neutral position of the valve 2.

To actuate the catch element 16, a control system is provided to hydraulically provoke engagement and disengagement of element 16 with respect to the recesses 12, 14. Catch element 16 is actuated by a piston 18 which delimits a control pressure chamber 20 which is connected, via a control pressure line 22, to an outlet 24 of a directly controlled pressure regulating valve 26. The input 28 of that valve 26 communicates with a branch line 30 from the system pressure line 32.

The pressure regulating valve 26 also has a third controlled connection 34 whereby the outlet 24 can be connected to a reservoir 36. The pressure regulating valve 26 is depicted schematically since such valves are well known and need not be described in detail herein.

The return line 38 of the pressure regulating valve 26 contains a throttle valve 40, the function of which will be described below. Spaced from throttle 40 at point y a switching pressure line 42 opens into the return line 38. Switching line 42 is also connected to branch line 30, via a pressure limiting valve 44. The operating characteristics of the pressure regulating valve 26 and the pressure limiting valve are both adjustable, by varying the force of the respective return springs.

Figure 2:
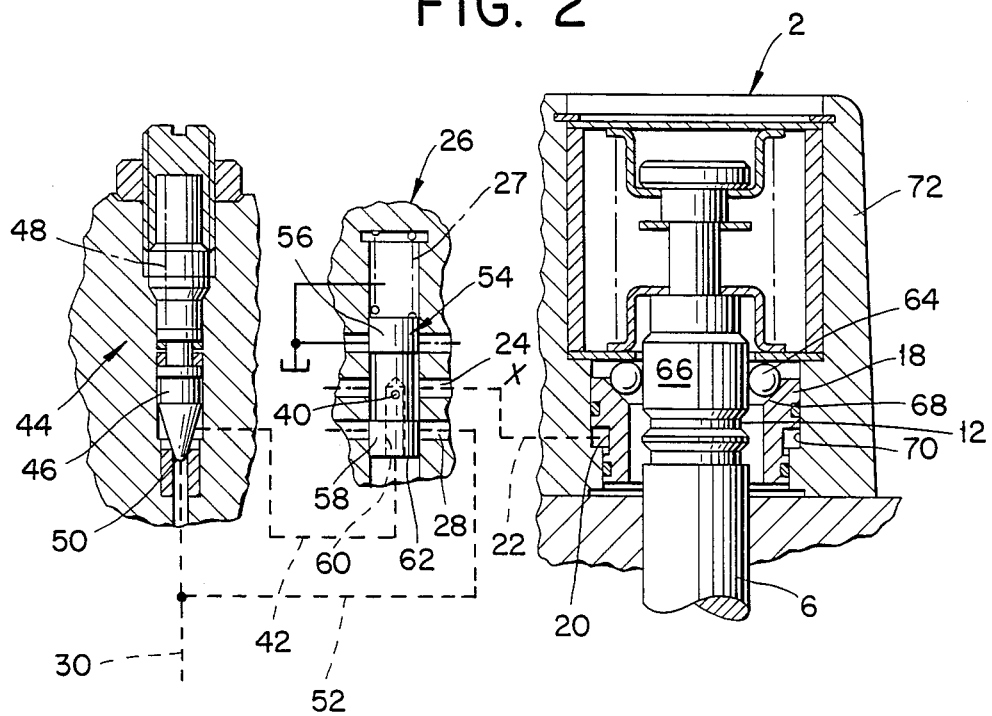
FIG. 2 is a schematic illustration of features of components employed in the control system according to FIG. 1.

In FIG. 2, details of the hydraulic components employed in the switching system according to FIG. 1 are illustrated. Parts corresponding to components described above are given the same respective reference numerals.

It is seen in FIG. 2 that the pressure limiting valve 44 is comprised of a seat-type valve, the valve stem 46 of which is exposed at its seat 50 to the pressure in the branch line 30, and at its opposite side to the force of a spring 48.

Ahead of the pressure limiting valve 44, a supply line 52 branches from the branch line 30 to the inlet 28 of the conventional pressure regulating valve 26. Valve 26 has a valve piston 54 which has control lands 56, 58 at opposite ends. In between is the outlet 24, which can influence a control side 62 of the valve piston 54, via a radial bore 40 forming a throttle, and via an axial bore 60. The side 62 is also acted on by the pressure in the switching pressure line 42 which proceeds from the pressure limiting valve 44.

On the right side in FIG. 2 a part of the multi-position valve 2 with valve slide 6 is illustrated. Balls 64 are provided as catch elements, which are held confined between a cylindrical surface 66 of the slide 6 and a conical surface 68 of a catch piston 18. Adjoining the cylindrical surface 66 of the slide, a catch recess 12 is provided, in the form of a ring-shaped groove into which the balls can enter when the valve slide 6 (FIG. 2) is pushed upwardly out of the neutral position and into switching position B. At the other end of valve slide 6 (not shown in FIG. 2), a corresponding ring-shaped groove 14 is provided, for switching position A.

The control pressure chamber 20 is formed between the catch piston 18 and an inner wall 70 of a valve housing 72. Chamber 20 communicates with the control pressure line 22. Pressure in the control pressure chamber 20 can force the catch piston 18 upwardly (according to FIG. 2) against the balls 64. If the balls 64 are in an engaged catch position, the valve slide 6 is maintained in a catch-maintained switching position by the effect of the pressure in the control pressure chamber 20.

Figure 3:
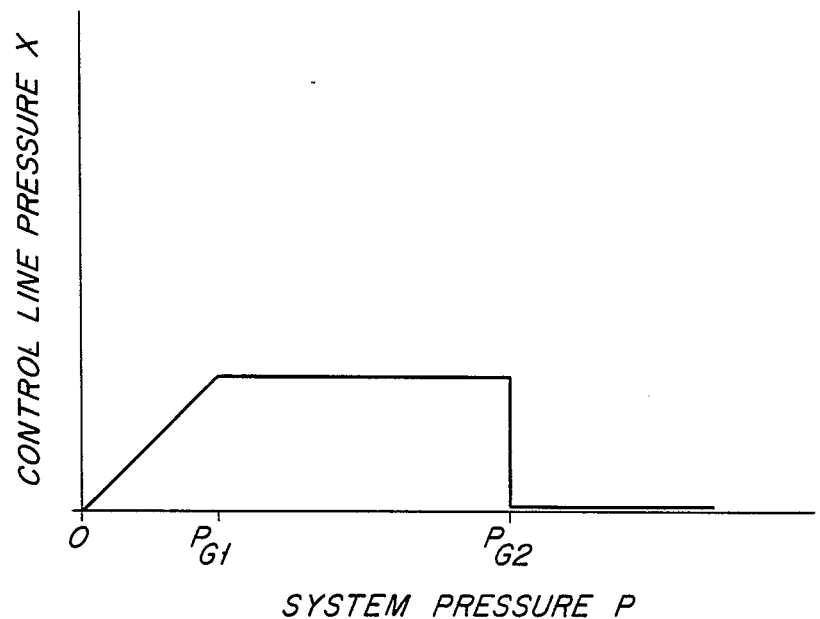
FIG. 3 is a diagram representing the pressure in the control pressure chamber over the course of the pressure in the hydraulic system.

The functioning of the above-described first embodiment will now be described (see also FIG. 3) in more detail. When the motor is not running (thus when pump 4 is not running), the multi-position valve 2 is held in a neutral position shown in FIGS. 1 and 2; the control line pressure X is zero, as is the system pressure P in the system pressure line 32. If the system pressure is now raised by starting the motor and switching on the pump 4, the pressure P increases and is transmitted at full value to the control pressure chamber 20, via branch line 30, inlet 28, pressure regulating valve 26, and control pressure line 22. This increase of the control line pressure X matches and is simultaneous with the rise of the system pressure P up to the limit value $P_{G1}$, at which value the pressure-reducing function of the pressure regulating valve 26 becomes operative. That is, from this first pressure limit $P_{G1}$, the control line pressure X is maintained constant, independently of any increase in pressure P in the system pressure line 32, whereby the catch force exerted by the balls 64 remains constant regardless of pressure P.

Until the control line pressure X reaches pressure $P_{G1}$, the slide 6 can be moved to the neutral position by the force of either of the springs 8, 10. When the control line pressure is at $P_{G1}$, the slide 6 cannot be shifted by those springs, but can be manually shifted between positions A, B and neutral against a constant resistance $P_{G1}$.

When the system pressure P reaches a second limit $P_{G2}$, the pressure limiting valve 44 is forced open such that this pressure $P_{G2}$ is fed to the switching pressure line 42. An overriding condition (i.e., overload condition, for control purposes) of the pressure regulating valve 26 abruptly results, via the throttle 40, whereby valve 26 is moved, against the force of a preferably adjustable control spring 27, into a position in which the outlet 24 is connected to the reservoir line 34. As a result, the control line pressure X falls to essentially the reservoir pressure, so that the catch action is released hydraulically, and the spring 8 or 10 returns the multi-position valve to its neutral position. The pressure limiting valve 44 is coordinated with the control system such that sufficient hydraulic oil flows through this valve to keep the pressure in the switching pressure line 42 high enough that the pressure regulating valve 26 moves into the overload position.

If the system pressure P is then reduced, the valve 44 will close when the second limit pressure $P_{G2}$ is reached. The pressure in the switching pressure line 42 decreases via throttle 40, so that the pressure regulating valve 26 can return to the regulating position wherein a limited outlet pressure is provided. If the pump 4 is stopped, e.g., along with the motor of the mobile machine, not only does the system pressure P fall to zero but the control line pressure X also falls to zero, so that the valve slide 6 is automatically returned to the neutral position. If the system pressure is thereafter raised upon start-up, there is no danger that one of the load connections A or B will be unintentionally supplied with the system pressure.

It is clear from the preceding description that the described hydraulic control system provides the following advantages:

(1) The catch holding of the multi-position valve is limited to a system pressure range which has upper and lower limits. When the system pressure is outside this range, the valve slide is automatically released from the catch action.

(2) The catch element itself is acted on solely by the control line pressure X, so that no additional pressure (and no additional force-transforming element, such as a spring element) is needed. In this way, the design of the catch element can be extremely simple.

Figure 4:
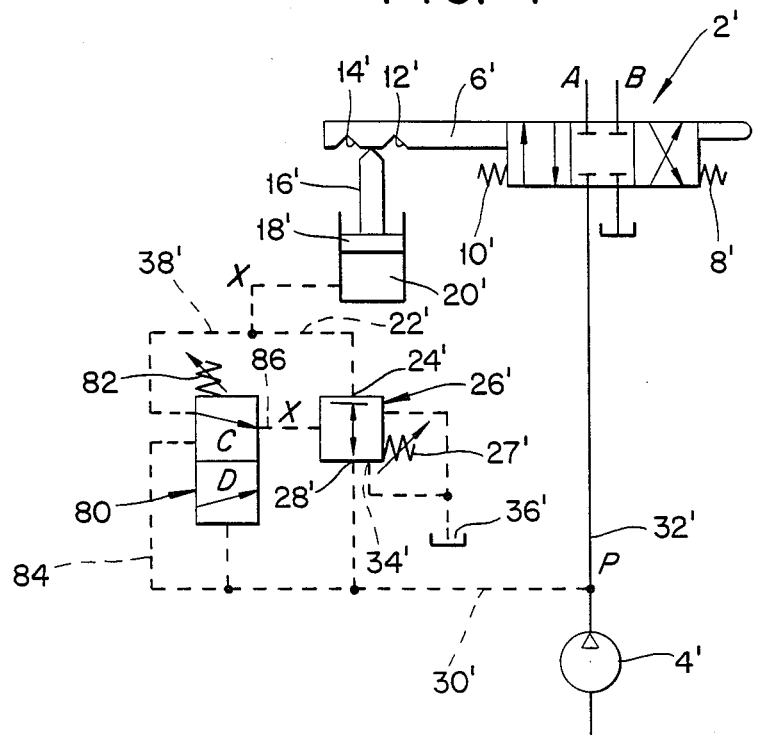
FIG. 4 is a block circuit diagram similar to that of FIG. 1, of a second embodiment of the hydraulic control system according to the invention.

A variant of the hydraulic control system for hydraulically holding and releasing a multi-position valve by catch means will be described hereinbelow with reference to FIG. 4. To simplify the description, the components of the control system which are directly comparable to corresponding components of the embodiment according to FIG. 1 have been given respectively the same reference numerals, except that the reference numerals in FIG. 4 have been marked with the "prime" system (').

As in the embodiment of FIG. 1, a system pressure line 32' is fed by a pump 4' and extends to a 4/3-way valve 2' having a valve slide 6' with two catch recesses 12', 14' which can be engaged by a catch element 16'. The latter can be actuated via a catch-controlling piston which delimits a control chamber 20'. The control pressure chamber 20' is supplied by a control pressure line 22' connected to the outlet 24' of a pressure regulating valve 26'. An inlet 28' of the pressure regulating valve 26' communicates with a branch line 30' which transmits the system pressure P. In the same manner as in the embodiment of FIG. 1, the pressure regulating valve 26' can be moved against the force of an adjustable control spring 27', into a switching position wherein the outlet 24' can be connected to a third controlled connection 34' leading to a low pressure level such as a reservoir 36'.

The return line 38' of the pressure regulating valve 26' leads to a switching valve 80 in the form of a 3/2-way valve. Note that this is a departure from the above-described embodiment. The slide of this switching valve is movable from the illustrated switching position C into the second switching position D by means of pressure in the branch line 30' acting against the force of a spring 82 which spring preferably is adjustable. In position D, the return line 38 is blocked off, and a switching pressure line 84 (previously blocked off) is connected to a segment 86 of the return line 38'. In this switching position D, the above-described overload condition (for control purposes) of pressure regulating valve 26' is brought about, whereby the control pressure chamber 20' is depressurized by connection to the tank 36'. By adjusting the spring 82, the above-described second limit pressure $P_{G2}$ is set. The first limit pressure $P_{G1}$ is determined by the control spring 27'.

Obviously, the invention is not limited to the above-described exemplary embodiments. Thus, it is not necessary that the pressure in the branch line 30' correspond to the system pressure P. The pressure in branch line 30' (or 30) may be derived from a load pressure rather than from a pump pressure. It is also not necessary that the pressure in the control pressure chamber 20 (or 29') be identical with the outlet pressure of the pressure regulating valve 26 (or 26'). Also, the pressure in the control pressure chamber could come from a pressure modulating valve.

To reiterate, there is provided a novel hydraulic control system for a multi-position valve, the slide of which valve has at least one switching position which can be held by a catch mechanism. The catch mechanism can be released by reducing the catch-engaging pressure of a catch element which is controlled via a control pressure chamber. The catch-engaging control pressure prevailing in the control pressure chamber acts on the catch element in the catch-engaging direction, and is derived from the outlet pressure of a pressure regulating valve. The latter is included in a branch line which carries a pressure derived from the system pressure of the hydraulic circuit. When a prescribed system pressure is exceeded, the pressure regulating valve can be moved into a position wherein the control pressure chamber is substantially depressurized by connecting it to a lower pressure level. Using this arrangement, when a prescribed load or pump pressure in the hydraulic circuit is reached, the catch action on the multi-position valve is automatically released; and if the pump is shut-off, the catch action on the multi-position valve is also automatically released.

Although the present invention has been described in connection with preferred embodiments thereof, it will be appreciated by those skilled in the art that additions, modifications, substitutions, and deletions not specifically described may be made without departing from the spirit and scope of the invention as defined in the appended claims.

What is claimed is:

1. A hydraulic system comprising a source of system fluid pressure; a multi-position valve including a movable member movable to at least one working position in which system fluid pressure from said source is conducted to a work station; retaining means for retaining said movable member in said at least one working position; a control pressure chamber for directing fluid control pressure against said retaining means for urging said retaining means in a retaining direction for retaining said movable member; and supplying means including a pressure regulating valve for supplying said control pressure chamber with control fluid pressure derived from said system pressure until said system pressure exceeds a predetermined pressure value at which time said supplying means communicates said control pressure chamber with a substantially lower pressure.

2. A hydraulic system according to claim 1, wherein said movable member comprises a reciprocable slide biased to a neutral position by biasing means at a biasing pressure greater than said substantially lower pressure.

3. A hydraulic system according to claim 1, wherein said supplying means comprises a branch line extending from said source of system pressure to said control pressure chamber, said pressure regulating valve conducting control fluid pressure equal to said system fluid pressure from said source to said control pressure chamber while said system pressure is below a prescribed pressure range and for conducting a constant pressure to said control pressure chamber while said system pressure is in said prescribed pressure range, said constant pressure being within said prescribed pressure range, said predetermined pressure value comprising an upper limit of said prescribed pressure range.

4. A hydraulic system according to claim 3, wherein said supplying means includes pressure limiting means operably connected to said pressure regulating valve and responsive to said system pressure for reducing said control fluid pressure to said substantially lower pressure when said system pressure exceeds said predetermined pressure value.

5. A hydraulic system according to claim 4, wherein said pressure limiting means is arranged to move said pressure regulating valve to a position communicating said control pressure chamber to a reservoir when said system pressure exceeds said predetermined pressure value.

6. A hydraulic system according to claim 5, wherein said pressure regulating valve comprises a slidable member, said pressure limiting means comprising a pressure limiting valve which is opened by said system pressure when said system pressure exceeds said predetermined pressure value, and a return line extending from said pressure limiting valve to an end of said pressure regulating valve for conducting said system pressure to an end of said slidable member for moving said slidable member when said pressure limiting valve is open.

7. A hydraulic system according to claim 6, wherein said return line communicates with said control pressure chamber and includes a throttle.

8. A hydraulic system according to claim 7, wherein said pressure limiting valve includes a seat and valve stem spring-biased closed against said seat, said seat communicating with said system pressure such that system pressure acts to open said valve stem.

9. A hydraulic system according to claim 1 including means for adjusting said predetermined pressure value.

10. A hydraulic system according to claim 3, wherein said supplying means includes a switching valve operably connected to said pressure regulating valve and responsive to said system pressure for movement from a first position to a second position when said system pressure exceeds said predetermined pressure value, said pressure regulating valve comprising a slidable member, said switching valve arranged to conduct said control fluid pressure to an end of said slidable member when in said first position and to conduct system pressure to said end of said slidable member when in said second position for moving said movable member to a position communicating said control pressure chamber with a pressure substantially below said predetermined pressure value.

11. A hydraulic system according to claim 3, wherein said pressure regulating valve comprises a slidable member biased in one direction by adjustable spring means and movable in an opposite direction to a position communicating said control pressure chamber with said pressure substantially below said predetermined pressure value.

12. A hydraulic system according to claim 1, wherein said multi-position valve comprises a component of a hydraulic switching circuit of a mobile machine, the motor of which drives a pump defining said source of system pressure.

13. A hydraulic system comprising:
a source of system fluid pressure;
a multi-position valve including:
 a movable member movable between a neutral position and at least one working position in which system fluid pressure from said source is conducted to a work station; and
 biasing means for applying a biasing pressure to said movable member which biases said movable member to said neutral position;
retaining means for acting against said movable member in a retaining direction for retaining said movable member in said at least one working position against the action of said biasing pressure;
a control pressure chamber for directing fluid control pressure against said retaining means for urging said retaining means in said retaining direction; and
applying means for supplying said control pressure chamber with control fluid pressure derived from said system pressure and for regulating said control fluid pressure such that said control fluid pressure is sufficient to effectively resist said biasing pressure when said system pressure is in a prescribed pressure range greater than zero and is insufficient for effectively resisting said biasing pressure when said system pressure is below or above said prescribed pressure range.

14. A hydraulic system according to claim 13, wherein said supplying means comprises a pressure regulating valve conducting control fluid pressure equal to said system fluid pressure from said source to said control pressure chamber while said system fluid pressure is below said prescribed pressure range and for conducting a constant pressure to said control pressure chamber while said system fluid pressure is in said prescribed pressure range, said constant pressure being within said prescribed pressure range.

* * * * *